Jan. 24, 1956     H. E. SJÖSTRAND     2,731,887
BALANCING ROTATABLE BODIES
Filed Nov. 15, 1951     3 Sheets-Sheet 1
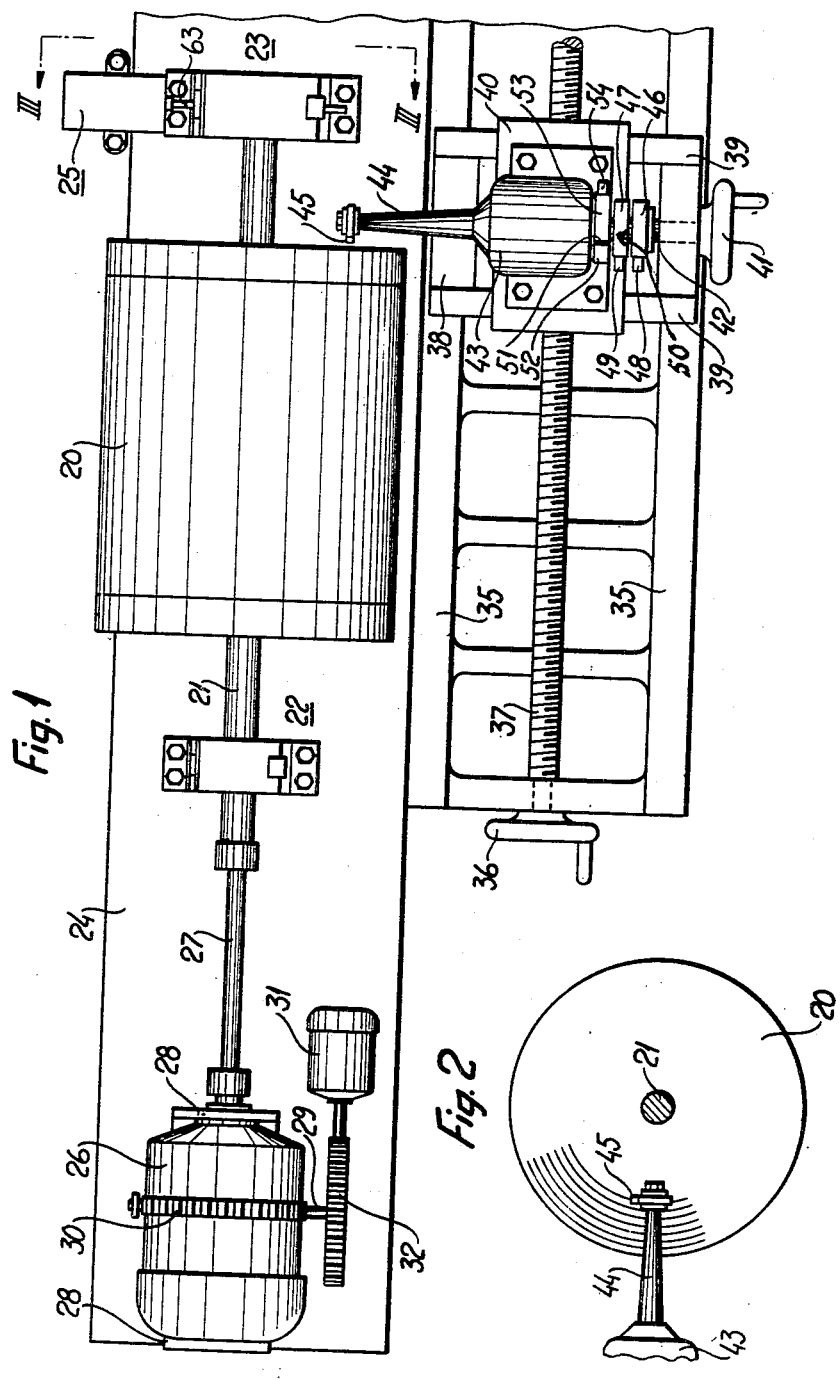
H. E. Sjostrand
By Henry C. Parker
Atty.

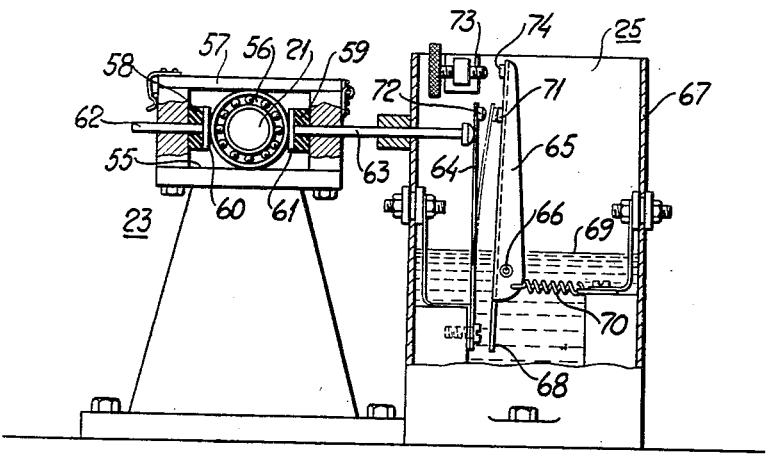
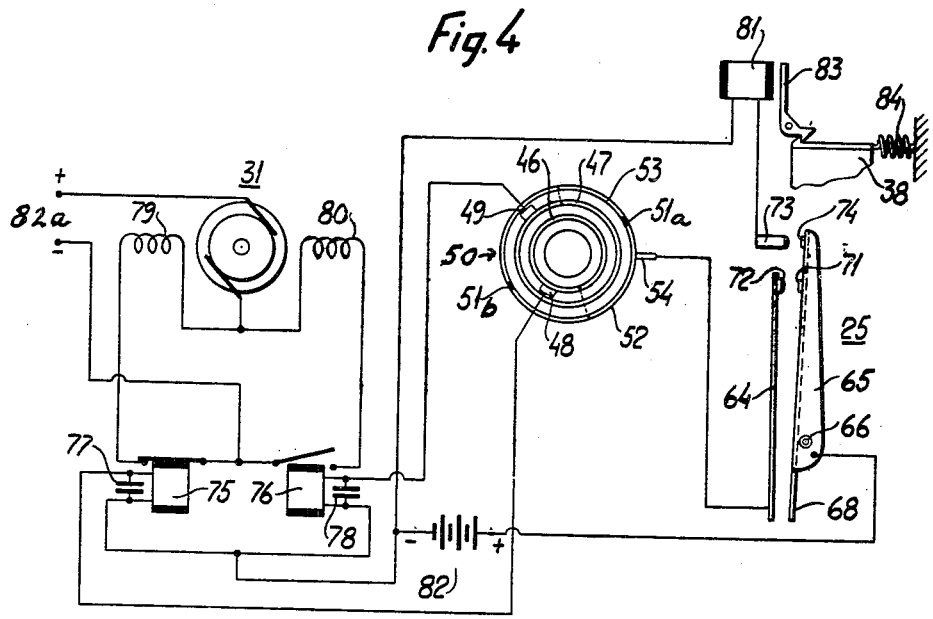

Jan. 24, 1956 H. E. SJÖSTRAND 2,731,887
BALANCING ROTATABLE BODIES
Filed Nov. 15, 1951 3 Sheets-Sheet 3
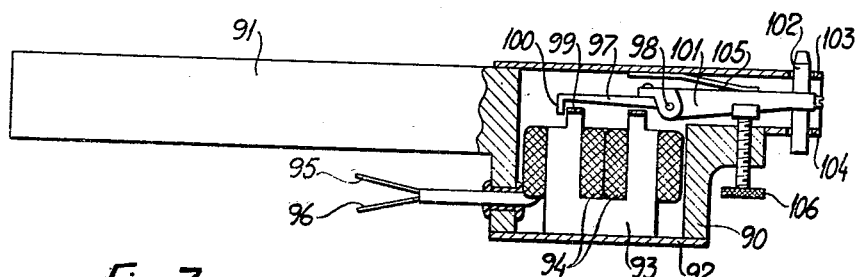
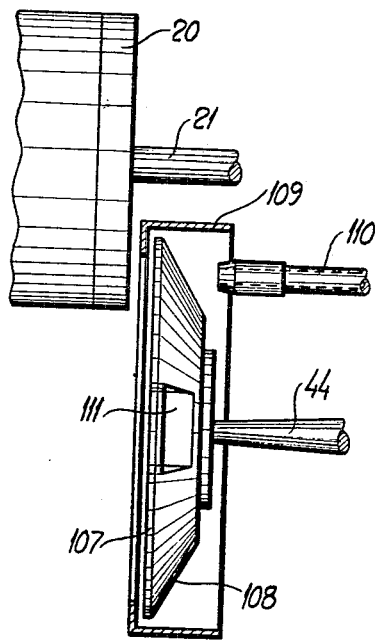
H. E. Sjostrand
By Henry C. Parker
Atty.

United States Patent Office 2,731,887
Patented Jan. 24, 1956

2,731,887

BALANCING ROTATABLE BODIES

Hjalmar Emanuel Sjöstrand, Saxdalen, Sweden

Application November 15, 1951, Serial No. 256,467

15 Claims. (Cl. 90—11)

The present invention relates to the art of dynamically balancing rotatable bodies, such as rotors for electric motors, steam turbines or the like.

It is an object of the invention to provide an improved method and an improved arrangement for balancing a rotatable body by removing material from the heaviest side or applying material to the lightest side of such body during rotation thereof under control of the vibrations set up in the body because of its unbalanced condition.

It is a particular object of the invention to provide a method and an arrangement for removing the existing unbalance from a rotatable body automatically under control of the vibrations set up in the body during rotation thereof.

Another object of the invention is to provide an indicating instrument for determining the angular position of the unbalance of a rotatable body and/or the degree of unbalance, such instrument being adapted for use either in connection with the balancing arrangement provided according to the invention or independently of such arrangement.

Other objects of the invention will appear from the following detailed description of suitable embodiments with reference to the accompanying drawings, on which:

Figure 1 is a top view of a balancing arrangement, in which material is removed from the heaviest side of the rotating body.

Figure 2 is an end view of the rotor being balanced in the arrangement according to Figure 1, a cutter included in said arrangement being shown in operative position.

Figure 3 is an end view partly in vertical section on a larger scale seen in the direction of the arrows III—III in Figure 1 of a bearing which is yieldable in a horizontal direction, and of an impulse contact device built together with said bearing.

Figure 4 is an electric wiring diagram appertaining to the arrangement according to Figure 1.

Figure 5 is an end view of a modified rotating cutter.

Figure 6 is a cutting steel holder having a cutting steel actuated by an eccentric.

Figure 7 shows an arrangement for applying material onto the lightest side of the rotatable body.

Figure 8 shows a differential included in a modified balancing arrangement.

According to Figure 1 the rotatable body 20, from which the unbalance is to be removed, has plane end surfaces which are perpendicular to the axis of the body. The rotatable body 20 is secured on a shaft 21 which is mounted for rotation in two pedestal bearings 22, 23, which are supported on a base plate 24. In the pedestal 22 the shaft 21 is supported through the intermediary of a spherical ball bearing rigidly clamped in position in the pedestal, whereas in the pedestal 23 the shaft 21 is supported through a ball bearing which is yieldably held in a normal position in a horizontal guide provided in the bearing pedestal (see Fig. 3), so that on existing unbalance in the body 20 the shaft 21 can perform an oscillating movement in the horizontal plane about the centre of the spherical ball bearing. Adjacent to the pedestal bearing 23 there is mounted an impulse contact device, generally designated 25, which device is actuated by the oscillations of the shaft 21. The driving motor 26, which is coupled to the shaft 21 by means of a flexible intermediate shaft 27, consists of a synchronous motor having a double pole rotor with permanent magnets, which rotor makes for example 3000 revolutions per minute. The stator of the synchronous motor is rotatably supported in a frame 28, mounted on the base plate 24, and is adapted to be adjusted to different angular positions by means of a worm 29 which cooperates with a toothed ring 30 on the stator. For turning the worm 29 there is provided a small reversible electro-motor 31 the shaft of which is coupled with the worm by means of a worm gearing 32.

On two straight guides 35, which are parallel with the axis of the rotatable body 20 in its position of rest, there is mounted a first carriage 38 which is displaceable along the guides by means of a screw 37 provided with a hand wheel 36. Said first carriage is provided with two straight guides 39 which are perpendicular to the guides 35 and along which a second carriage 40 is displaceable by means of a screw 42 provided with a hand wheel 41. On said second carriage 40 a small synchronous motor 43 is mounted at such a level that the axis of its rotor shaft coincides with a horizontal plane through the axis of the body 20. The synchronous motor 43 is connected to the same alternating current net as the synchronous motor 26, is of similar design and is assumed to rotate with the same speed as the latter.

On an extension 44 of the rotor shaft of the synchronous motor 43 there is mounted a cutter having a single radially directed cutting steel or tooth 45. On the said rotor shaft there are furthermore mounted two undivided metallic slip rings 46 and 47 (Fig. 4), each cooperating with an appertaining brush 48 and 49, and furthermore a slip ring, shown generally at 50, which by means of two thin insulating laminae 51a and 51b positioned in the same diametrical plane is divided into two segments 52 and 53, see Fig. 4. The segment 52 is electrically connected with the slip ring 46 and the segment 53 with the slip ring 47. Cooperating with the divided slip ring 50 is a brush 54, the thickness of which is less than the thickness of each one of the insulating laminae. For the sake of simplicity the insulating laminae 51a and 51b are assumed to be positioned in the same axial plane as the cutting steel 45.

As is seen in Figure 3, the bearing pedestal 23 shown in elevation is formed with a horizontal plane supporting surface 55 for a ball bearing race 56 in which the shaft 21 is supported. Said supporting surface forms together with a plane under-surface on a bearing lid 57 a horizontal guide, in which the ball bearing race is yieldingly held in a definite normal position by means of two elastically compressible blocks 58 and 59 of rubber or the like, between which the ball bearing race is clamped through the intermediary of two metal plates 60 and 61. The metal plates 60 and 61 are carried each on the free end of an appertaining one or two horizontally directed plunger-like members 62 and 63, which are inserted in bores in the bearing pedestal 23 and serve to indicate the lateral oscillating movement of the rotating body 20.

In the embodiment shown the plunger 63 is arranged to actuate the impulse contact device 25, which according to Figure 3 comprises a contact spring 64 which is clamped in position at one end and cooperates with a contact arm 65 which is swingable about a horizontal axis 66. The contact spring 64 and the contact arm 65 are disposed in an oil tight vessel 67, which is mounted on the base plate 24. At its lower end the contact arm 65 is provided with a spade-like damping member 68, which dips down into a quantity of viscid oil that fills the vessel 67 up to the level 69. A weak spiral spring 70 strives to turn the contact arm 65 about the axis 66 to bring its contact 71 into engagement with the contact 72 of the blade spring 64. During the balancing operation the contact spring 64 will swing out once for each revolution towards the position indicated with dotted lines under the action of the plunger 63, carrying along the contact arm 65. On account of the damping action of the damping blade 68 which dips down into the oil, the contact arm 65 cannot follow the blade spring 64 when the latter swings back but remains substantially in the swung-out position shown on the drawing. This means that a closing of short duration occurs between the contacts 72 and 71 for each revolution of the body which is being balanced exactly at the moment when the body has swung out a maximum distance in the horizontal direction to the right in Figure 3. On slowly reducing unbalance and a consequent reduced deflection of the blade spring 64 the contact arm 65 will, however, follow under the action of the spring 70 to a limit position which is determined by a limit screw 73 carried by and inserted from the vessel 67, the contact arm 65 engaging said limit screw with an end contact 74. The limit screw 73 is adjusted in such a position that the contact 74 on the contact arm 65 contacts the contact screw 73 when the rotatable body to be balanced is at rest or has become substantially balanced. The duty of the limit screw 73 will be described in the following.

As will be clear from the diagram of connections shown in Figure 4, the blade spring 64 is connected to the brush 54 which cooperates with the divided slip ring 52, 53 mounted on the shaft of the cutting steel motor 43. The brushes 48 and 49, which cooperate with the undivided slip rings 46 and 47 on the same shaft, are connected each with a coil of an appertaining relay 75 or 76 respectively. Said relays are designed to be actuated by pulsating direct current having exceedingly short current impulses, and they are therefore provided each with a condenser 77 and 78 respectively, which shunts the magnet coil. On attracting their armature the relays 75 and 76 connect into circuit at their working contacts a corresponding one of two magnet field windings 79 and 80 on the direct current motor 31 in order to bring the motor to rotate in one direction or the other.

The embodiment according to Figures 1 to 4 operates in the following manner.

After an unbalanced rotor 20 has been mounted in the bearings 22 and 23 and has been coupled together with the driving motor 26, the two synchronous motors 26 and 43 are started. The carriage 40 has been pulled back, so that the cutter 45 on the cutter motor 43 is out of engagement with the rotor 20, whereas the carriage 38 is in operative position.

When the motors have reached full speed the contacts 72 and 71 are closed for a brief moment each time the rotor 20 makes its maximum deflection to the right in Figure 3, as described above. A circuit is then closed from the positive pole of the battery 82 and through the contact arm 65, the contacts 71 and 72, the contact spring 64, the brush 54, the slip ring half 52, the slip ring 46, the brush 48 and through the operating winding of the relay 75 to the negative pole of the battery 82. The relay 75 attracts its armature and closes a second circuit, which extends from the positive pole of the battery 82a, through the armature of the motor 31 and its field winding half 79 to the negative pole of the battery. The motor 31 then starts to rotate in such a direction as to turn through the gearings 29, 30, 32 the stator of the driving motor 26 clockwise as viewed in Figure 2. The motor 31 will continue to rotate until one of the insulating laminae 51a or 51b in the divided slip ring 52, 53 occupies a position right opposite the narrow brush 54. At this moment, when the contacts 72 and 71 are closed, the circuit through the relay is interrupted by the insulating laminae, so that the relay drops its armature and interrupts the current through the motor 31 which comes to a stand-still. With the electrical connections as shown in Fig. 4 this will occur when lamina 51a, for example, is beneath brush 54. In other words while the device is operating lamina 51a will evidently always be in a position opposite (180 angular degrees from) the rotor at the moment contacts 71, 72 are closed. At this same moment, of course, the heavy side of the rotor is directly opposite (180 angular degrees) from shaft 44; compare Figs. 1 to 4. Since cutter 45 obviously should be facing the rotor when the heavy side of the rotor is 180° from this point, i. e. when the heavy side of the rotor passes beneath shaft 44, it is only necessary to adjust the position of the cutter 45 on shaft 44 so it faces lamina 51a in the same radial plane. The cutter will then rotate 180° at the same time the rotor is rotating 180° and the cutter will arrive at its operating position at the moment the heavy side of the rotor passes beneath it.

The driving motor 26 and the cutter motor 43 now rotate in synchronism and in phase, and the rotating cutting steel 45 can now be fed by means of the hand wheel 51 into engagement with the rotor 20 radially towards the axis of the rotor, material being then for every revolution removed from a definite sector of the heaviest side of the rotor. The unbalance is thereby gradually reduced and will finally wholly or in the main disappear, the removal of material being then interrupted.

In the embodiment shown an interruption of the removal of material at the correct moment is obtained automatically through cooperation of the limit screw 73 with the end contact 74 of the contact arm 65. As seen in Figure 4, the above mentioned limit screw 73 is connected through the winding of a relay 81 to the negative pole of the battery 82, so that when the contact 74 on the contact arm 65 contacts the limit screw 73 the relay is energized and attracts its armature 83. Said armature is provided with a catch, which in the non-attractive position of the relay cooperates with a lock abutment on the cutter motor carriage 38 and holds said carriage in operative position against the action of a tensioned spring 84. When thus the relay 81 attracts its armature 83 the carriage 38 is released and is pulled back by the spring 84 to the right in Figure 1, the cutter being thereby brought to an inoperative position.

In case during the balancing operation an angular displacement of the axial plane through the heaviest side of the rotor with respect to the horizontal plane should take place, this condition will immediately manifest itself by that the closing of the contacts 72 and 71 does not any longer take place at the moment when the cutting steel 45 is in its engaging position with respect to the rotor 20, i. e. it does not any longer take place at the moment when the narrow brush 54 contacts the insulating lamina 51. This results in that one of the relays 75 and 76 becomes energized and causes the motor 31 to turn the stator of the driving motor 26 in such a direction that the required adjustment of the phase position is obtained.

In place of a rotating cutter having a single cutting steel or tooth, as shown in Figures 1 and 2, it is, of course, possible to mount on the shaft 44 a cutter having two or more teeth placed together on one side of the cutter, whereby the length of each cut is increased. Such a cutter is shown in Figure 5.

Another alternative embodiment of the cutting tool is indicated in Figure 6. According to said figure there is mounted on the shaft extension 44 an eccentric disc 85, which through a link 86 actuates a cutting steel 87 which is axially guided in an extension 88 of the motor bearing shield.

A reciprocating motion of a cutting steel to and from operative position in unison with the swinging-out of the body which is being balanced towards one side similar to the motion according to Figure 6 can also be obtained under direct control of the electric impulses which are produced on the brief closing of the control contacts 72, 71 by letting the control impulses actuate an electromagnet, which actuates the cutting steel. A cutting steel arrangement suitable for actuation by an electromagnet is shown in Figure 7.

In Figure 7 there is shown a modification of the balancing arrangement according to Figures 1 to 4, in which the unbalance is removed by applying material to the lightest side of the rotatable body 20. In said embodiment the motor 43 is turnable on the carriage 40 about a vertical axis, so that the motor shaft 44 can be adjusted to a position in parallel with the shaft 21 which carries the rotor 20 to be balanced, as schematically indicated in Figure 7. Mounted on the shaft 44 is a deflector wheel 107 provided with a conical deflecting surface 108 which against a surrounding protective casing 109 normally deflects a jet of molten metal coming from a nozzle 110 which is directed towards the end surface of the rotor 20. At one point of its circumference the deflector wheel 107 is provided with a window opening 111, which moves past the nozzle mouth once for every revolution, permitting the spray of molten metal to pass through, so that it hits the rotor.

Instead of using separate synchronously rotating motors for driving the body to be balanced and for driving the balancing tool, and providing said motors with means for changing the phase position between their rotors, as above described, it is of course possible to use a common driving motor and to insert a phase changing mechanical device in the movement transmitting mechanism from the driving motor. Such a phase changing mechanical device can, for example, consist of a differential gear having a gear housing which is adjustable to different angular positions, for instance as shown in Figure 8. According to said figure the gear housing 112 is turnably mounted in two bearing pedestals 113 and adjustable to the desired angular position by means of a worm 114 which cooperates with a toothed ring 115 on the gear housing. The worm 114 can be operated by hand or by a motor functioning in the same manner as motor 31. The incoming shaft 117 of the differential gear is driven from the shaft 21 of the body to be balanced through angular gears 116, while the outgoing shaft 118 through suitable transmission members, not shown, is coupled with the shaft 44 which carries the cutter, deflector wheel or the like.

The invention can be used both for dynamically balancing a rotatable body while rotating at a speed below the critical speed, as described in the above examples, as for dynamically balancing a rotatable body while rotating at a speed above the critical one. The changes in the various arrangements and devices shown and described should be obvious to anybody skilled in the art to which the present invention relates.

In the embodiments of the balancing machine, in which the balancing tool consists of a rotating cutter, the cutter can rotate either in the same direction as the end surface of the body being balanced or in the opposite direction. In the former case the relative speed between the cutting edge and the surface from which material is removed by the cutter is decreased. By varying the radial distance from the axis of the body being balanced to the cutting edge and/or by varying the radius of the cutter a suitable cutting speed can be obtained in each case.

I claim:

1. A device for bringing rotating bodies into weight balance dynamically, which comprises a pair of bearings for rotatably mounting the body to be balanced, at least one of said bearings being sufficiently elastic in one direction so that the rotating body oscillates the bearing substantially in a single plane in synchronism with the axial plane passing through the center of unbalance of the rotating body, driving means for rotating said body in said bearings, a cutting tool mounted for movement towards and away from said rotating body, means for driving said cutting tool in synchronism with the rotating body so that it makes a cut in the rotating body once only for each revolution and in a single axial cutting plane, means for automatically changing the phase relationship between the rotating body and the cutting tool so that the cutting plane is brought into coincidence with the axial plane of unbalance; said phase changing means comprising a spring contact member, means connecting the said elastic bearing and said spring contact for moving the latter in accordance with the oscillations of said bearing, an electric contact element mounted on the end of said spring contact member, a second contact member pivotally mounted adjacent said spring contact, an electrical contact element mounted on said second contact member and cooperating with the electrical contact element on the spring contact member, damping means attached to said pivoted contact member in such manner that said contact member tends to remain in such position that the two electrical contact elements barely engage as the spring contact reaches its point of maximum deflection, means for yieldingly pressing said pivoted contact member towards said spring contact member and against the action of the spring contact, an electric circuit including in series said electrical contact elements and electrical means for changing the relative phase angles of said axial planes to bring them into coincidence in accordance with the impulses received upon the contacting of said electrical contact elements; a second electrical contact element mounted on said pivoted contact member, a stationary contact element mounted adjacent said second contact element in such position that the two elements engage when the pivoted contact member reaches its position corresponding substantially to zero deflection of said spring contact and hence zero oscillation of said flexible bearing, an electrical circuit and means connected in said circuit in series with said last named electric contact elements for rendering inoperative said cutting tool when said elements close the said electrical circuit.

2. A device for dynamically balancing a rotating body, which comprises a pair of bearings for rotatably mounting the body to be balanced, at least one of said bearings being sufficiently elastic in at least one radial direction to permit the rotating body to oscillate in synchronism with the rotation of the axial plane passing through the center of unbalance of the rotating body, driving means for rotating said body in said bearings, means for adjusting the weight of the rotating body at a point on the body spaced from the center of rotation, a rotating member for positively controlling the operation of said weight adjusting means so as to make same intermittently effective within a comparatively small radial sector of the body to be balanced during revolution of said body, means responsive to said oscillations for bringing the symmetry plane of said radial sector into coincidence with the radial plane passing through the center of unbalance of said body, and means for stopping the operation of said weight adjusting means when oscillation of the rotating body diminishes to a substantial degree due to weight adjustment caused by said weight adjusting means.

3. The device of claim 2 wherein the rotatable member for controlling the weight adjusting means is a shaft rotating in synchronism with the body to be balanced.

4. The device of claim 2 wherein the driving means for the rotatable body to be balanced is a first synchronous motor and wherein a second synchronous motor is provided for driving the rotatable controlling member for the said weight adjusting means, the stator of at least one of said motors being angularly adjustable about the axis of its rotor to render said weight adjusting means effective within the desired sector of the body to be balanced.

5. The device of claim 2 wherein said weight adjusting means is a rotatable cutter which is mounted on the rotatable controlling member and shaped so as to engage the rotatable body to be balanced along a part only of its circumference.

6. The device of claim 5 wherein the cutter is adapted to rotate in a direction opposite to the direction of rotation of the body to be balanced to ensure a sufficiently low cutting speed.

7. The device of claim 2 wherein the weight adjusting means is a cutting steel adapted to perform a reciprocating movement towards and away from the body to be balanced under control of an eccentric on the rotatable controlling member.

8. A device for dynamically balancing a rotating body, which comprises a pair of bearings for rotatably mounting the body to be balanced, at least one of said bearings being sufficiently elastic in at least one radial direction to permit the rotating body to oscillate in synchronism with the rotation of the axial plane passing through the center of unbalance of the rotating body, driving means for rotating said body in said bearings, means for intermittently depositing material on the rotating body within a comparatively small sector thereof, means responsive to said oscillations for bringing the symmetry plane of said radial sector into coincidence with the radial plane passing through the center of unbalance of said body, and means for stopping the operation of said material depositing means when oscillation of the rotating body diminishes to a substantial degree due to the weight adjustment caused by said material depositing means.

9. The device of claim 8 wherein said material depositing device is a spraying device.

10. The device of claim 9 wherein the device is provided with a rotating shield with an opening through which a solidifying fluid is sprayed during each revolution of the shield.

11. A device for dynamically balancing an unbalanced rotatable body which comprises in combination a pair of bearings for rotatably mounting the body to be balanced, means for rotating said body in said bearings, rotary means for adjusting the weight of the rotating body intermittently effective only within a small radial sector of the body to be balanced during the rotation of said body and at a point on the body spaced from its center of rotation, means for rotating said weight-adjusting means in synchronism with the body to be balanced, means, operative while the body to be balanced and the weight-adjusting means are rotating, for adjusting the phase angle between said weight-adjusting means and said body to be balanced, means responsive to the oscillations of the body to be balanced, caused by the unbalance in said body, for automatically controlling said phase-angle-adjusting means to bring said weight-adjusting means directly in phase with the unbalance in said body to be balanced so that the small radial sector within which the weight-adjusting means is effective coincides with the radial position of the unbalance and means for rendering said weight-adjusting means operative until the unbalance of the body to be balanced is substantially eliminated.

12. The balancing device of claim 11 wherein at least one of said bearings is sufficiently elastic in at least one radial dimension to permit the body to be balanced to oscillate in synchronism with the rotation of the axial plane passing through the center of unbalance of the body to be balanced.

13. The balancing device of claim 11 in combination with means for automatically rendering said weight-adjusting means inoperative when the body to be balanced has been brought substantially into balance by said weight-adjusting means.

14. A device for dynamically balancing an unbalanced rotatable body which comprises in combination a pair of bearings for rotatably mounting the body to be balanced, means for rotating said body in said bearings, means for adjusting the weight of the rotating body effective only within a small radial sector of the body to be balanced during the rotation of said body and at a point spaced from its center of rotation, means for rotating said weight-adjusting means in synchronism with said body to be balanced; one of said rotating means being a motor having a rotor and a stator; and means responsive to the oscillations of the body to be balanced, caused by the unbalance in said body, for rotating the stator of said motor automatically to change the phase angle between the body to be balanced and the weight-adjusting means until the small radial sector within which the weight-adjusting means is effective is moved into coincidence with the radial position of the unbalance of the body to be balanced and means for rendering the weight-adjusting means operative until the unbalance of the body to be balanced is substantially eliminated.

15. A device for dynamically balancing an unbalanced rotatable body which comprises in combination a pair of bearings for rotatably mounting the body to be balanced, means for rotating said body in said bearings, rotary means for adjusting the weight of the rotating body effective only within a small radial sector of the body to be balanced during the rotation of said body and at a point spaced from its center of rotation, means for rotating said weight-adjusting means in synchronism with the body to be balanced, means responsive to the oscillations of the body to be balanced, caused by the unbalance in said body, for producing an electric impulse each time the said unbalance passes a given point during its rotation, means operated by said electric impulses for adjusting the phase angle between the body to be balanced and the weight-adjusting means so that the small radial sector within which the weight-adjusting means is effective is moved into coincidence with the radial position of the unbalance, means for rendering said weight adjusting means operative and means for stopping the operation of the weight-adjusting means when the oscillations of said body are reduced to a predetermined point.

References Cited in the file of this patent

UNITED STATES PATENTS

| 728,315 | Snell | May 19, 1903 |
| 2,171,927 | Fuchs | Sept. 5, 1939 |
| 2,346,975 | Laboulais | Apr. 18, 1944 |
| 2,382,665 | Riopelle et al. | Aug. 14, 1945 |
| 2,432,659 | Criswell | Dec. 16, 1947 |
| 2,449,429 | Van Degrift et al. | Sept. 14, 1948 |